United States Patent
Okohira

(10) Patent No.: US 10,391,942 B2
(45) Date of Patent: Aug. 27, 2019

(54) ELECTRONIC MIRROR APPARATUS

(71) Applicant: Panasonic Intellectual Property Management Co., Ltd., Osaka (JP)

(72) Inventor: Takashi Okohira, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 15/555,996

(22) PCT Filed: Mar. 14, 2016

(86) PCT No.: PCT/JP2016/001424
§ 371 (c)(1),
(2) Date: Sep. 6, 2017

(87) PCT Pub. No.: WO2016/157767
PCT Pub. Date: Oct. 6, 2016

(65) Prior Publication Data
US 2018/0056876 A1    Mar. 1, 2018

(30) Foreign Application Priority Data
Mar. 31, 2015    (JP) .................. 2015-070857

(51) Int. Cl.
*B60R 1/08*        (2006.01)
*B60R 1/04*        (2006.01)
(Continued)

(52) U.S. Cl.
CPC ............. *B60R 1/088* (2013.01); *B60R 1/04* (2013.01); *B60R 1/12* (2013.01); *B60R 1/1207* (2013.01);
(Continued)

(58) Field of Classification Search
CPC .. B60R 1/088; B60R 1/04; B60R 1/12; B60R 1/1207; B60R 2001/1223;
(Continued)

(56) References Cited

U.S. PATENT DOCUMENTS 5,883,605 A    3/1999  Knapp
2010/0097469 A1   4/2010  Blank et al.

FOREIGN PATENT DOCUMENTS

EP        602962 A2    6/1994
JP      2012-168554    9/2012
(Continued)

OTHER PUBLICATIONS

International Search Report of PCT application No. PCT/JP2016/001424 dated Apr. 12, 2016.
(Continued)

*Primary Examiner* — Collin X Beatty
(74) *Attorney, Agent, or Firm* — Greenblum & Bernstein, P.C.

(57) ABSTRACT

An electronic mirror apparatus includes a display unit to display the image taken by an imaging unit mounted on a vehicle, a light control filter disposed at a side of the display unit nearer to a driver's seat, and a controller. The light control filter shifts between the light reflection state to reflect light and the light transmission state to transmit light in response to a state of voltage applied to the light control filter. The controller causes the display unit to display an image when the light control filter is in the light transmission state or in the period of transition from the light reflection state to the light transmission state. The controller performs control such that at least part of the image displayed on the display unit is brighter when the light control filter is in the period of transition than is in the light transmission state.

9 Claims, 5 Drawing Sheets

(51) Int. Cl.
   *B60R 1/12*     (2006.01)
   *G02F 1/153*    (2006.01)
   *G02F 1/157*    (2006.01)
   *G02F 1/01*     (2006.01)

(52) U.S. Cl.
   CPC ............... *G02F 1/01* (2013.01); *G02F 1/157* (2013.01); *G02F 1/1533* (2013.01); *B60R 2001/1223* (2013.01); *B60R 2001/1253* (2013.01)

(58) Field of Classification Search
   CPC . B60R 2001/1253; G02F 1/01; G02F 1/1533; G02F 1/157
   USPC ......................................................... 359/267
   See application file for complete search history.

(56)          References Cited

FOREIGN PATENT DOCUMENTS

| | | |
|---|---|---|
| JP | 2012-181389 | 9/2012 |
| WO | 2004/098953 | 11/2004 |

OTHER PUBLICATIONS

The Extended European Search Report dated Feb. 14, 2018 for the related European Patent Application No. 16771661.2.

ELECTRONIC MIRROR APPARATUS

This application is a U.S. national stage application of the PCT International Application No. PCT/JP2016/001424 filed on Mar. 14, 2016, which claims the benefit of foreign priority of Japanese patent application No. 2015-070857 filed on Mar. 31, 2015, the contents all of which are incorporated herein by reference.

TECHNICAL FIELD

The present invention relates to an electronic mirror apparatus that displays an image or a picture taken by an in-vehicle imaging unit.

BACKGROUND ART

Conventionally, light control filters made from electrochromic material have been utilized for mirrors and other parts on vehicles. The electrochromic material of this kind is capable of decreasing reflectance to reduce the glare from the headlights of a following car.

This electrochromic technology is exemplified in PTL 1, which discloses an electrochromic rear-view mirror with increased speeds in light control and transmission, for example.

PTL 2 discloses a light control filter that shifts between a light reflection state and a light transmission state in response to a state of voltage applied to the filter.

CITATION LIST

Patent Literature

PTL 1: Unexamined Japanese Patent Publication No. 2012-168554
PTL 2: Unexamined Japanese Patent Publication No. 2012-181389

SUMMARY OF THE INVENTION

It is an object of the present invention to provide an electronic mirror apparatus that prevents the viewability of an image displayed on a display unit behind a light control filter from being degraded even if the light control filter is in a period of transition from a light reflection state to a light transmission state.

An electronic mirror apparatus according to the present invention includes a display unit, a light control filter, and a controller. The display unit is capable of displaying an image taken by an imaging unit mounted on a vehicle. The light control filter is disposed at a side of the display unit nearer to a driver's seat. The light control filter shifts between a light reflection state to reflect light and a light transmission state to transmit light in response to a state of voltage applied to the light control filter. The controller controls the display unit and the light control filter. The controller causes the display unit to display an image when the light control filter is in the light transmission state or in a period of transition from the light reflection state to the light transmission state. The controller performs control such that at least part of the image displayed on the display unit is brighter when the light control filter is in the period of transition than is in the light transmission state.

The electronic mirror apparatus according to the present invention prevents the viewability of an image displayed on the display unit behind the light control filter from being degraded even if the light control filter is in a period of transition from the light reflection state to the light transmission state.

DESCRIPTION OF EMBODIMENTS

Prior to describing exemplary embodiments of the present invention, problems of a conventional device will be briefly described. Technology for instantaneously transitioning electrochromic material into a light transmission state has not been developed until now despite improvements in the speed of transitioning the material into a light transmission state.

As a result, while an electrochromic material is transitioning into a light transmission state, both light reflected at the electrochromic material and light transmitted from behind the electrochromic material exist. Because of coexistence of the reflected and transmitted light, a viewer who wants to view an object behind the electrochromic material faces difficulty in viewing the object.

Hereinafter, exemplary embodiments of the present invention will be described in detail with reference to the drawings. Note that the exemplary embodiments described below are only illustrative, and do not limit the scope of the present invention.

First Exemplary Embodiment

Figure 1:
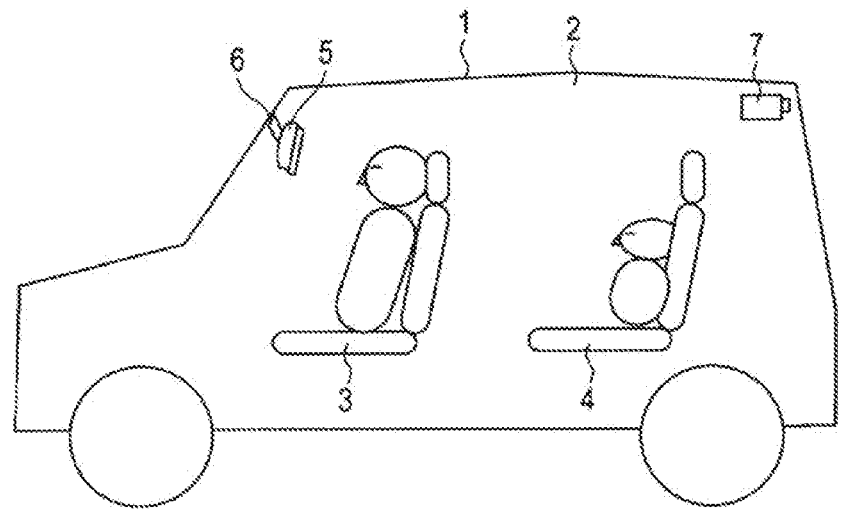
FIG. 1 is an example drawing illustrating a vehicle equipped with an electronic mirror apparatus according to a first exemplary embodiment of the present invention.

FIG. 1 is an example drawing illustrating vehicle 1 equipped with electronic mirror apparatus 5 according to a first exemplary embodiment of the present invention. Vehicle 1 includes front seat 3 (a driver's seat and a passenger seat) disposed in a forward region of interior 2 and rear seat 4 disposed in a backward region of interior 2.

Electronic mirror apparatus 5 is attached at an attaching position of a rear-view mirror located forward of front seat 3 such that an attaching angle relative to holder 6 is adjustable. Imaging unit 7 is disposed rearward of rear seat 4 and is configured to take an image behind vehicle 1.

Electronic mirror apparatus 5 can display images behind vehicle 1 taken by imaging unit 7. Electronic mirror apparatus 5 communicates with imaging unit 7 by using wired or wireless communication so that images taken with imaging unit 7 are sent from imaging unit 7 to electronic mirror apparatus 5.

Figure 2:
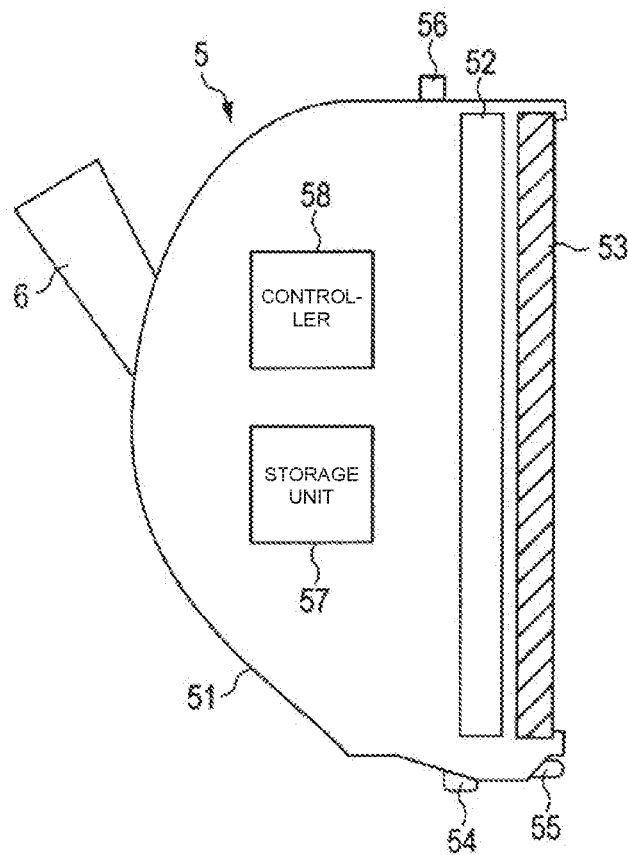
FIG. 2 is an example configuration of the electronic mirror apparatus shown in FIG. 1.

FIG. 2 is an example configuration of electronic mirror apparatus 5 shown in FIG. 1.

With reference to FIG. 2, electronic mirror apparatus 5 includes: main casing 51 having an opening on a side facing front seat 3; display unit 52, i.e. a liquid crystal display that is contained in main casing 51 such that a display surface of display unit 52 faces front seat 3; and light control filter 53 disposed nearer to front seat 3 in comparison with display unit 52. Electronic mirror apparatus 5 further includes: operating unit 54 that puts display unit 52 into an on-state or an off-state; light intensity sensor 55 that detects illuminance in interior 2 of vehicle 1; temperature sensor 56 that detects a temperature in interior 2 of vehicle 1; storage unit 57 that stores various information such as a set value for luminance of a backlight in display unit 52 and a set value for a voltage applied to light control filter 53; and controller 58 that controls display unit 52 and light control filter 53.

Light control filter 53 is a device that shifts between a light reflection state to reflect light and a light transmission state to transmit light in response to a state of voltage applied to the filter. Light control filters like light control filter 53 are described in detail in literature such as PTL 2.

Controller 58 controls display unit 52 and light control filter 53. Specifically, controller 58 causes display unit 52 to display an image if light control filter 53 is in the light transmission state or in a period of transition from the light reflection state to the light transmission state. This control will now be described in more detail.

When display unit 52 is put into the off-state due to an operation performed on operating unit 54, controller 58 regulates a voltage applied to light control filter 53 so as to put light control filter 53 into the light reflection state with the reflectance of 50% or greater (preferably the reflectance of 80% or greater). In this state, light control filter 53 serves as a mirror. This configuration enables a driver to check the rear via an image shown on light control filter 53.

When display unit 52 is put into the on-state due to the operation performed on operating unit 54, controller 58 regulates the voltage applied to light control filter 53 so as to put light control filter 53 into the light transmission state with the transmittance of 50% or greater (preferably the transmittance of 80% or greater). In this state, light control filter 53 transmits images displayed on display unit 52. This configuration enables the driver to check the rear via an image of behind vehicle 1 that is displayed on display unit 52.

Controller 58 performs control such that an image displayed on display unit 52 are brighter when light control filter 53 is in a period of transition from the light reflection state to the light transmission state than is in the light transmission state.

Specifically, controller 58 controls the backlight of display unit 52 such that the backlight emits brighter light when light control filter 53 is in the period of transition described above than is in the light transmission state, thereby making the image displayed on display unit 52 brighter during the period of transition.

Control performed by controller 58 over display unit 52 will now be described in detail.

Figure 3:
FIG. 3 is a chart illustrating examples of changes in light reflectance and light transmittance of a light control filter according to the first exemplary embodiment over a period of transition from a light reflection state to a light transmission state.

FIG. 3 is a chart illustrating examples of changes in light reflectance and light transmittance of light control filter 53 over a period of transition from the light reflection state to the light transmission state. In FIG. 3, the vertical axis shows reflectance (%) or transmittance (%), and the horizontal axis shows the amount of time (second) elapsed from interruption of application of voltage to light control filter 53.

With reference to FIG. 3, after interruption of application of voltage to light control filter 53, the light transmittance increases and the light reflectance decreases. Light control filter 53 shifts from the light reflection state to the light transmission state over this period of transition. After the elapse of this period, light control filter 53 goes into the light transmission state.

A graph of the light reflectance and a graph of the light transmittance intersect with each other at a point of substantially 10 seconds in time. After this point of time, the impact of reflection of light at light control filter 53 on image viewability gets small. Thus, as long as controller 58 continues control for brightening the image until this point of time, the purpose is achieved.

Depending on a type of light control filter 53, the graphs of the light reflectance and the light transmittance may intersect with each other at a point of less than 10 seconds in time, other than the point of substantially 10 seconds described above.

In the case of a point of shorter time length as well, the purpose is achieved as long as controller 58 continues control for brightening the image until the point of time at which the graphs of the light reflectance and the light transmittance intersect with each other.

Figure 4:
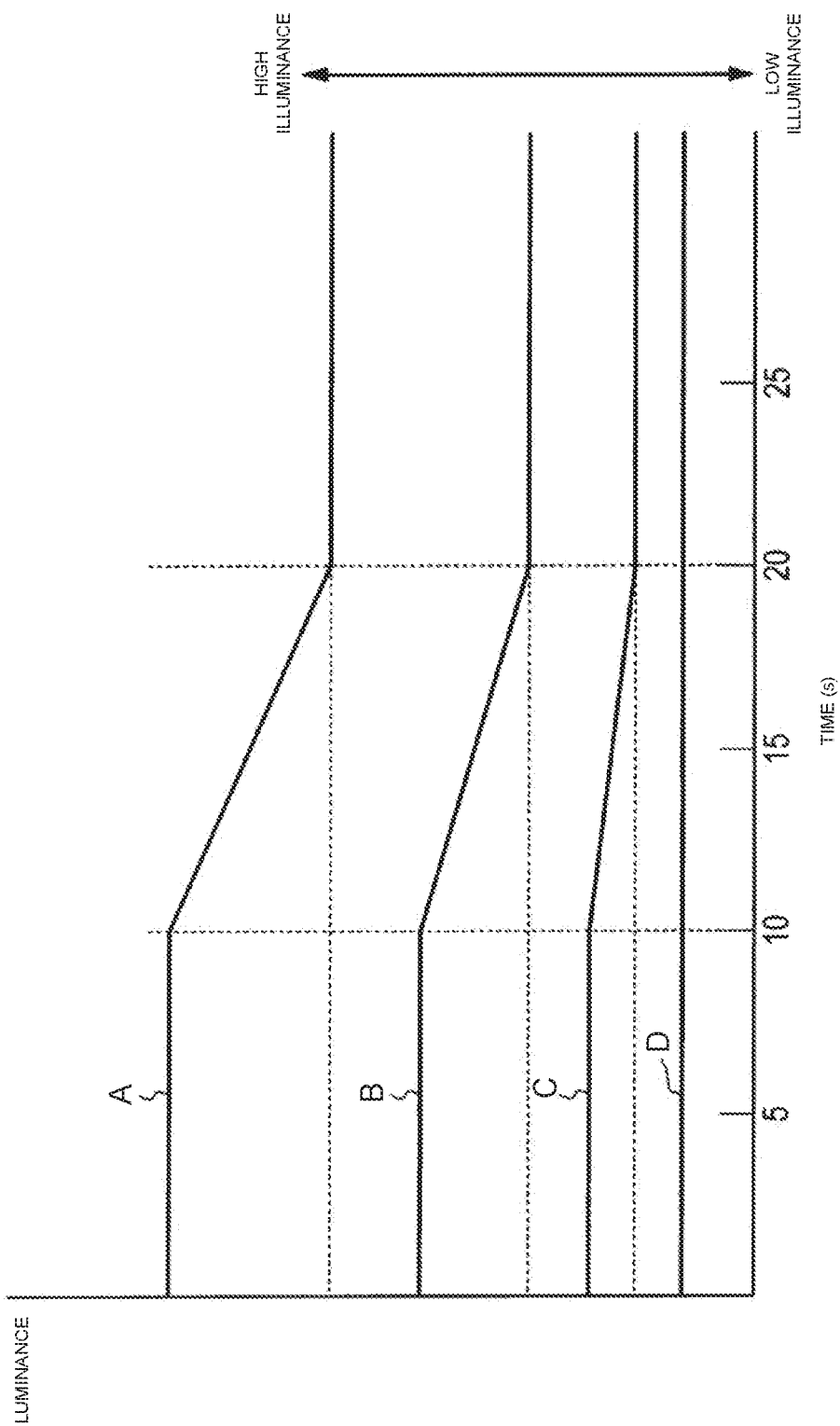
FIG. 4 is a chart illustrating a method of controlling luminance of a backlight according to the first exemplary embodiment.

FIG. 4 is a chart illustrating a method of controlling luminance of the backlight. In FIG. 4 the vertical axis shows luminance (relative value) of the backlight, and the horizontal axis shows the amount of time (second) elapsed from interruption of application of voltage to light control filter 53.

In graph A for example, the luminance after the elapse of 20 seconds following interruption of application of voltage to light control filter 53 is luminance predetermined for light control filter 53 in the light transmission state.

In this case, controller 58 controls the backlight such that until the elapse of 10 seconds following interruption of application of voltage to light control filter 53, the luminance of the backlight is, for example, around 30% higher than luminance predetermined for time after the elapse of 20 seconds.

As a result, the backlight illuminates liquid crystal from the rear, thereby brightening the image displayed on display unit 52 and highlighting the image. This configuration prevents image viewability from being degraded due to the impact of reflection of light at light control filter 53.

After performing control to brighten the image until a predetermined point of time, controller 58 gradually changes the brightness of the image to a brightness level predetermined for light control filter 53 in the light transmission state.

Specifically, with reference to graph A in FIG. 4, controller 58 performs control to cause the backlight to have the enhanced luminance until the elapse of 10 seconds and then gradually decreases the luminance of the backlight to the luminance predetermined for a time after the elapse of 20 seconds.

This configuration prevents image brightness from changing abruptly and thus the driver does not feel a sense of awkwardness in the brightness change.

Controller 58 may determine a point of time at which it stops control for enhancing the luminance of the backlight (in the example of FIG. 4, a point of 10 seconds in time after interruption of voltage application) in accordance with a temperature in interior 2 of vehicle 1 and perform the control until the determined point of time. This is because the characteristics shown in FIG. 3 changes depending on the temperature in interior 2 of vehicle 1.

In this case, storage unit 57 stores information about the point of time at which the controller stops the control for enhancing the luminance of the backlight in association with the temperature in interior 2 of vehicle 1, for example. Controller 58 acquires information about a temperature detected with temperature sensor 56 and reads the information about the point of time associated with the temperature from storage unit 57.

Controller 58 performs the control for enhancing the luminance of the backlight until the point of time, and after that, gradually decreases the luminance of the backlight. This configuration enables the apparatus to properly adjust a time over which the control described above is performed.

Moreover, controller 58 may perform control such that the level of brightening the image displayed on display unit 52 is lowered with a decrease in illuminance in interior 2 of vehicle 1. The illuminance in interior 2 of vehicle 1 is detected with light intensity sensor 55.

FIG. 4 shows graphs A to D, for example. The ratio of luminance before the elapse of 10 seconds to luminance after the elapse of 20 seconds decreases in the order of graphs A, B, C, and D. The luminance after the elapse of 20 seconds corresponds to the luminance for light control filter 53 in the light transmission state, and the luminance before the elapse of 10 seconds corresponds to the luminance for light control filter 53 in the period of transition from the light reflection state to the light transmission state.

In this case, controller 58 switches the graph used for control of the luminance of the backlight from graph A to graph B, from graph B to graph C, and from graph C to graph D, for example, with a decrease in illuminance detected with light intensity sensor 55.

If vehicle 1 is driving at night time or through a tunnel, for example, interior 2 of vehicle 1, as well as the image taken with imaging unit 7 are dark in illuminance. Highlighting the image with the enhanced luminance of the backlight in this situation makes the image unnaturally brightened.

If interior 2 of vehicle 1 is dark, the impact of reflection of light at light control filter 53 on image viewability is small even if light control filter 53 has not been fully put into the light transmission state. This in turn reduces the necessity to highlight the image with the enhanced luminance of the backlight.

Consequently, controller 58 controls the backlight so as to lower the ratio described above with a decrease in illuminance detected with light intensity sensor 55. This configuration prevents the image from being unnaturally brightened and thus contributes to a reduction in power consumption.

Second Exemplary Embodiment

In the first exemplary embodiment described above, controller 58 controls the backlight of display unit 52 and thereby brightens the image. The image may be brightened by lowering a gamma value of display unit 52.

In the present exemplary embodiment described below, controller 58 lowers the gamma value of display unit 52. Display unit 52 may be any display unit of any type, such as an organic electro-luminescent (EL) display, other than the liquid crystal display.

Figure 5:
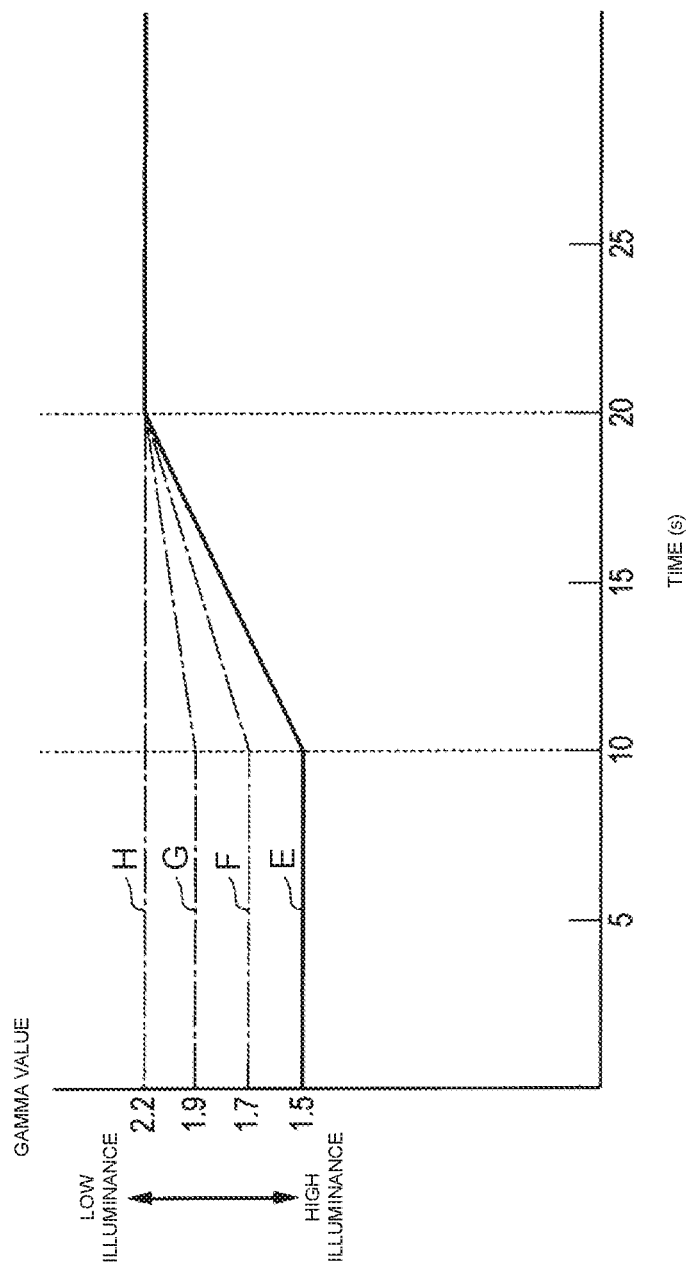
FIG. 5 is a chart illustrating a method of controlling a gamma value of a liquid crystal display according to a second exemplary embodiment of the present invention.

FIG. 5 is a chart illustrating a method of controlling the gamma value. In FIG. 5 the vertical axis shows the gamma value, and the horizontal axis shows the amount of time (second) elapsed from interruption of application of voltage to light control filter 53.

In graph E for example, the gamma value after the elapse of 20 seconds following interruption of application of voltage to light control filter 53 is a gamma value predetermined for light control filter 53 in the light transmission state. In FIG. 5, this gamma value is 2.2, for example.

In this case, controller 58 performs control such that the display unit has a gamma value lower than the predetermined gamma value described above until the elapse of 10 seconds following interruption of application of voltage to light control filter 53. In FIG. 5, this gamma value is 1.5, for example.

This configuration brightens the image displayed on display unit 52 and highlights the image. This in turn prevents image viewability from being degraded due to the impact of reflection of light at light control filter 53.

After performing control to brighten the image until a predetermined point of time, controller 58 gradually changes the brightness of the image to a brightness level predetermined for light control filter 53 in the light transmission state.

Specifically, with reference to graph E in FIG. 5, controller 58 performs control to cause the display unit to have a lowered gamma value until the elapse of 10 seconds and then gradually increases the gamma value to the gamma value predetermined for time after the elapse of 20 seconds.

This configuration prevents image brightness from changing abruptly and thus the driver does not feel a sense of awkwardness in the brightness change.

Controller 58 may determine a point of time at which it stops control for lowering the gamma value (in the example of FIG. 5, a point of 10 seconds in time after interruption of voltage application) in accordance with a temperature in interior 2 of vehicle 1 and perform the control until the determined point of time. This is because the characteristics shown in FIG. 3 changes depending on the temperature in interior 2 of vehicle 1.

In this case, storage unit 57 stores information about the point of time at which the controller stops the control for lowering the gamma value in association with the temperature in interior 2 of vehicle 1, for example. Controller 58 acquires information about a temperature detected with temperature sensor 56 and reads the information about the point of time associated with the temperature from storage unit 57.

Controller 58 performs the control for lowering the gamma value until the point of time, and after that, gradually increases the gamma value. This configuration enables the apparatus to properly adjust a time over which the control described above is performed.

Moreover, controller 58 may perform control such that the level of brightening the image displayed on display unit 52 is lowered with a decrease in illuminance in interior 2 of vehicle 1. The illuminance in interior 2 of vehicle 1 is detected with light intensity sensor 55.

FIG. 5 shows graphs E to H, for example. The gamma value before the elapse of 10 seconds increases in the order of graphs E, F, G, and H. The gamma value before the elapse of 10 seconds corresponds to a gamma value for light control filter 53 in the period of transition from the light reflection state to the light transmission state.

In this case, controller 58 switches the graph for control of the gamma value from graph E to graph F, from graph F to graph G, and from graph G to graph H, for example, with a decrease in illuminance detected with light intensity sensor 55.

If vehicle 1 is driving at night time or through a tunnel, for example, interior 2 of vehicle 1, as well as the image taken with imaging unit 7 are dark in illuminance. Highlighting the image with the lowered gamma value in this situation makes the image unnaturally brightened.

If interior 2 of vehicle 1 is dark, the impact of reflection of light at light control filter 53 on image viewability is small even if light control filter 53 has not been fully put into the light transmission state. This in turn reduces the necessity to highlight the image with the lowered gamma value.

Consequently, controller 58 performs control so as to increase the gamma value as described above with a decrease in illuminance detected with light intensity sensor 55. This configuration prevents the image from being unnaturally brightened.

Third Exemplary Embodiment

In the second exemplary embodiment described above, controller 58 lowers the gamma value of display unit 52 to brighten the image. The image may be at least partly brightened by enhancing image contrast.

In the present exemplary embodiment described below, controller 58 enhances image contrast. Display unit 52 may be any display unit of any type, such as an organic electroluminescent (EL) display, other than the liquid crystal display.

Figure 6:
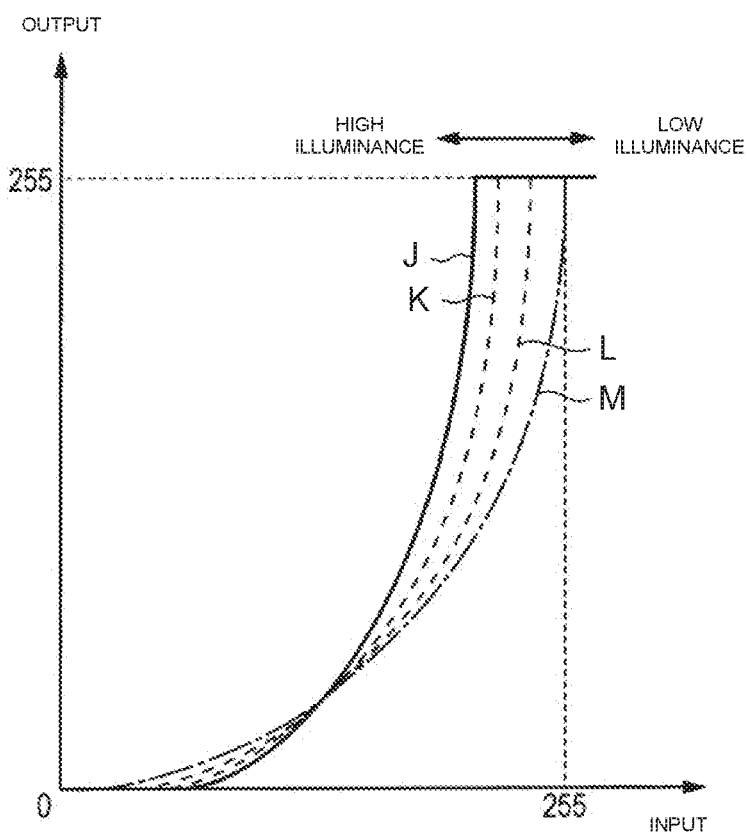
FIG. 6 is a chart illustrating a method of controlling contrast of a liquid crystal display according to a third exemplary embodiment of the present invention.

FIG. 6 is a chart illustrating a method of controlling contrast. In FIG. 6 the vertical axis shows an image output value, and the horizontal axis shows an image input value.

For example, the controller performs control using graph J until the elapse of 10 seconds following interruption of application of voltage to light control filter 53 and performs control using graph M after the elapse of 20 seconds following interruption of application of voltage to light control filter 53.

The controller uses graph J rather than graph M until the elapse of 10 seconds following interruption of application of voltage to light control filter 53, so that the image contrast shows a maximum output value of 255 in a high input value range.

This configuration brightens at least part of an image displayed on display unit 52 and highlights the image. This in turn prevents image viewability from being degraded due to the impact of reflection of light at light control filter 53.

After controlling display unit 52 to brighten the image until a predetermined point of time, controller 58 gradually changes the brightness of the image to a brightness level predetermined for light control filter 53 in the light transmission state.

Specifically, with reference to graphs J to M in FIG. 6, controller 58 makes a correction using graph J for enhancing the image contrast to brighten at least part of the image until the elapse of 10 seconds and then corrects the image contrast using graph K and graph L in this order until start of use of graph M after the elapse of 20 seconds following interruption of application of voltage to light control filter 53.

This configuration prevents image brightness from changing abruptly and thus the driver does not feel a sense of awkwardness in the brightness change.

Controller 58 may determine a point of time at which it stops control for enhancing the contrast (in the example described above, a point of 10 seconds in time after interruption of voltage application) in accordance with a temperature in interior 2 of vehicle 1 and perform the control until the determined point of time. This is because the characteristics shown in FIG. 3 changes depending on the temperature in interior 2 of vehicle 1.

In this case, storage unit 57 stores information about the point of time at which the controller stops the control for enhancing the contrast in association with the temperature in interior 2 of vehicle 1, for example. Controller 58 acquires information about a temperature detected with temperature sensor 56 and reads the information about the point of time associated with the temperature from storage unit 57.

Controller 58 performs the control for enhancing the contrast until the point of time, and after that, gradually decreases the contrast. This configuration enables the apparatus to properly adjust a time over which the control described above is performed.

Moreover, controller 58 may perform control such that the level of brightening the image displayed on display unit 52 is lowered with a decrease in illuminance in interior 2 of vehicle 1. The illuminance in interior 2 of vehicle 1 is detected with light intensity sensor 55.

With reference to graphs J to M shown in FIG. 6, controller 58 switches the graph for correction of the image contrast before the elapse of 10 seconds from graph i to graph K, from graph K to graph L, and from graph L to graph M, for example, with a decrease in illuminance detected with light intensity sensor 55.

If vehicle 1 is driving at night time or through a tunnel, for example, interior 2 of vehicle 1, as well as the image taken with imaging unit 7 are dark in illuminance. Highlighting the image with the enhanced contrast in this situation makes some of the image unnaturally brightened.

If interior 2 of vehicle 1 is dark, the impact of reflection of light at light control filter 53 on image viewability is small even if light control filter 53 has not been fully put into the light transmission state. This in turn reduces the necessity to highlight the image with the enhanced contrast.

Consequently, controller 58 performs control so as to lower the contrast as described above with a decrease in illuminance detected with light intensity sensor 55. This configuration prevents the image from being unnaturally brightened.

INDUSTRIAL APPLICABILITY

The present invention can be suitably applied to electronic mirror apparatuses that display images or pictures taken by imaging units mounted on vehicles.

REFERENCE MARKS IN THE DRAWINGS

1: vehicle
2: interior
3: front seat
4: rear seat
5: electronic mirror apparatus
6: holder
7: imaging unit
51: main casing
52: display unit
53: light control filter
54: operating unit
55: light intensity sensor
56: temperature sensor
57: storage unit
58: controller

The invention claimed is:
1. An electronic mirror apparatus comprising:
a display which in operation displays an image taken by an imaging unit mounted on a vehicle;
a light control filter disposed at a side of the display nearer to a driver's seat, the light control filter in operation shifting between a light reflection state and a light transmission state in response to a state of voltage applied to the light control filter, the light reflection state including a state in which the reflectance of light of the light control filter is higher than the transmittance of light of the light control filter, the light transmission state including a state in which the transmittance of light of the light control filter is higher than the reflectance of light of the light control filter; and a controller which in operation controls the display, wherein the controller in operation controls the display to not display the image when the light control filter is in the light reflection state, and controls the display to display the image when the light control filter is in the light transmission state and in a period of transition from the light reflection state to the light transmission state, in the period of transition, the reflectance of light of the light control filter decreases, and the transmittance of light of the light control filter increases, and the controller in operation controls the display to:
set a brightness of at least part of the image displayed on the display to a first brightness level during a sub period included in the period of transition, and
set a brightness of the at least part of the image displayed on the display to a second brightness level which is lower than the first brightness level, during the light transmission state.

2. The electronic mirror apparatus according to claim 1, wherein
in the sub period, the transmittance of light of the light control filter is below a predetermined value,
after the sub period and during the period of transition, the controller in operation controls the display to gradually change the brightness of the at least part of the image from the first brightness level to the second brightness level.

3. The electronic mirror apparatus according to claim 2, wherein
an end point of the sub period is a point when the reflectance of light of the light control filter and transmittance of light of the light control filter are substantially the same in value.

4. The electronic mirror apparatus according to claim 2, wherein
an end point of the sub period is within 10 seconds after a start of the period of transition.

5. The electronic mirror apparatus according to claim 1, wherein
in the sub period, the transmittance of light of the light control filter is below a predetermined value,
the controller determines an end point of the sub period in accordance with a temperature inside the vehicle.

6. The electronic mirror apparatus according to claim 1, wherein
the display is a liquid crystal display equipped with a backlight that illuminates liquid crystal from a rear of the display, and
the controller in operation controls the display to set the brightness of the at least part of the image displayed on the display to the first brightness level by controlling the backlight.

7. The electronic mirror apparatus according to claim 1, wherein
the controller in operation controls the display to set the brightness of the at least part of the image displayed on the display to the first brightness level by controlling a gamma value of the display.

8. The electronic mirror apparatus according to claim 1, wherein
the controller in operation controls the display to set a brightness of the at least part of the image displayed on the display to the first brightness level by controlling a contrast of the image.

9. The electronic mirror apparatus according to claim 1, wherein
the controller in operation controls the display such that a level of brightening of the at least part of the image is lowered with a decrease in illuminance inside the vehicle.

* * * * *